United States Patent
Greathouse et al.

(10) Patent No.: US 10,713,059 B2
(45) Date of Patent: Jul. 14, 2020

(54) HETEROGENEOUS GRAPHICS PROCESSING UNIT FOR SCHEDULING THREAD GROUPS FOR EXECUTION ON VARIABLE WIDTH SIMD UNITS

(71) Applicant: Advanced Micro Devices, Inc., Sunnyvale, CA (US)

(72) Inventors: Joseph L. Greathouse, Austin, TX (US); Mitesh R. Meswani, Austin, TX (US); Sooraj Puthoor, Austin, TX (US); Dmitri Yudanov, Austin, TX (US); James M. O'Connor, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 469 days.

(21) Appl. No.: 14/490,213

(22) Filed: Sep. 18, 2014

(65) Prior Publication Data
US 2016/0085551 A1   Mar. 24, 2016

(51) Int. Cl.
*G06F 9/38* (2018.01)

(52) U.S. Cl.
CPC .......... *G06F 9/3887* (2013.01); *G06F 9/3851* (2013.01)

(58) Field of Classification Search
CPC ............... G06F 9/30036; G06F 9/3851; G06F 9/3885–3887; G06F 17/16; G06F 15/80–803; G06F 15/8053; G06F 1/3234–3246; G06F 1/3287–329; G06F 15/8092; G06F 15/16
See application file for complete search history.

(56) References Cited

U.S. PATENT DOCUMENTS

| | | | | |
|---|---|---|---|---|
| 6,983,389 B1* | 1/2006 | Filippo | ................ | G06F 1/3203 713/324 |
| 7,617,384 B1* | 11/2009 | Coon | .................... | G06F 9/3851 712/220 |
| 2011/0320765 A1* | 12/2011 | Karkhanis | ........... | G06F 9/30109 712/7 |
| 2013/0042090 A1* | 2/2013 | Krashinsky | ........... | G06F 9/3016 712/214 |
| 2014/0136816 A1* | 5/2014 | Krig | .................... | G06F 15/8007 712/15 |
| 2014/0181477 A1* | 6/2014 | Vaidya | ................ | G06F 9/30018 712/208 |

(Continued)

OTHER PUBLICATIONS

Jiayuan Meng, David Tarjan, Kevin Skadron. "Dynamic Warp Subdivision for Integrated Branch and Memory Divergence Tolerance" Proceedings of ISCA 2010.*

(Continued)

*Primary Examiner* — Jacob Petranek
(74) *Attorney, Agent, or Firm* — Volpe and Koenig, P.C.

(57) ABSTRACT

A compute unit configured to execute multiple threads in parallel is presented. The compute unit includes one or more single instruction multiple data (SIMD) units and a fetch and decode logic. The SIMD units have differing numbers of arithmetic logic units (ALUs), such that each SIMD unit can execute a different number of threads. The fetch and decode logic is in communication with each of the SIMD units, and is configured to assign the threads to the SIMD units for execution based on such differing numbers of ALUs.

15 Claims, 7 Drawing Sheets

(56) References Cited

U.S. PATENT DOCUMENTS

| | | | | |
|---|---|---|---|---|
| 2014/0344549 A1* | 11/2014 | Nilsson | ............... | G06F 15/8053 |
| | | | | 712/7 |
| 2015/0143083 A1* | 5/2015 | Le | ....................... | G06F 9/30018 |
| | | | | 712/205 |
| 2015/0242210 A1* | 8/2015 | Kim | .................... | G06F 9/30036 |
| | | | | 712/7 |
| 2016/0132338 A1* | 5/2016 | Jin | ........................ | G06F 9/3851 |
| | | | | 712/206 |

OTHER PUBLICATIONS

Nicolas Brunie, Sylvain Collange, Gregory Diamos. "Simultaneous Branch and Warp Interweaving for Sustained GPU Performance", 39th Annual International Symposium on Computer Architecture (ISCA), Portland, OR, United States. pp. 49-60 (Year: 2012).*

* cited by examiner

HETEROGENEOUS GRAPHICS PROCESSING UNIT FOR SCHEDULING THREAD GROUPS FOR EXECUTION ON VARIABLE WIDTH SIMD UNITS

STATEMENT REGARDING FEDERALLY SPONSORED RESEARCH OR DEVELOPMENT

This invention was made with government support under Prime Contract Number DE-AC52-07NA27344, Subcontract Number B600716 awarded by the Department of Energy (DOE). The government has certain rights in the invention.

TECHNICAL FIELD

The disclosed embodiments are generally directed to graphics processing units, and in particular, to parallel dispatch of instructions in a graphics processing unit.

BACKGROUND

Current graphics processing units (GPUs) issue and execute groups of threads called a "wavefront." GPU architectures issue wavefronts of a constant, fixed size that depends on the GPU hardware's microarchitecture. In some implementations, a wavefront is a group of 64 threads, which are issued in groups of 16 threads through a 16 thread wide single instruction, multiple data (SIMD) unit over four cycles. In many cases, all 64 threads are executing. But some of these threads may be predicated off at various times, meaning that they execute but the results of the executed instructions are discarded. Predicating the threads is done to simplify the microarchitecture, yielding a smaller area and better chip-wide performance. But predicating the threads is also a source of inefficiency in the pipeline, as the predicated instructions take up space and power in the vector pipeline of the GPU.

FIG. 1 shows how an eight thread wide wavefront can be executed over two cycles on a four thread wide GPU microarchitecture. Threads 1-4 are issued on the first cycle, and threads 5-8 are issued on the second cycle. Some of these threads may be predicated off (for example, threads 3, 4, and 6-8) and are shown in FIG. 1 as empty boxes, showing inefficiencies in the GPU pipeline.

Many GPU workloads are non-uniform, and have numerous wavefronts with predicated-off threads. These instructions still take up space in the pipeline. Unfortunately, the predicated instructions take up space, waste power, produce heat, and produce no useful output.

Modern GPU microarchitectures have vector, scalar, and other functional units within the GPU cores. The type of instruction to be performed determines which unit of the pipeline will execute that particular instruction. For instance, scalar instructions (which are used for control flow) execute on the scalar units, while vector math instructions are combined into wavefronts and executed in parallel on vector pipelines. This approach allows the compiler/finalizer to make certain tradeoffs that are knowable at compile time (e.g., that an operation is replicated across all lanes of the vector, and thus can be executed once on a scalar unit and have its single result shared with all threads).

The current approaches do not address dynamic runtime behavior that is difficult or impossible to know at compile time. For example, there may be instances where all but one thread is waiting at a barrier for the one thread to complete. Unfortunately, at compile time, it is often impossible to know which thread will be the laggard because of data-dependent loop trip-counts, memory latency, whims of the scheduler, etc.

Similarly, static techniques cannot know when the vector units will run inefficiently due to issues like wavefront imbalance, where many threads will be predicated off.

SUMMARY OF EMBODIMENTS

Some embodiments provide a compute unit configured to execute multiple threads in parallel including one or more single instruction multiple data (SIMD) units and a fetch and decode logic. The SIMD units have differing numbers of arithmetic logic units (ALUs), such that each SIMD unit can execute a different number of threads. The fetch and decode logic is in communication with each of the SIMD units, and is configured to assign the threads to the SIMD units for execution based on such differing numbers of ALUs. With this construction, no thread (or a lesser number of threads) will be predicated off.

Some embodiments provide a computing system configured to execute multiple threads in parallel including a plurality of single instruction multiple data (SIMD) units and a plurality of issue units. The SIMD units have differing numbers of arithmetic logic units (ALUs), such that each SIMD unit can execute a different number of threads. Each issue unit is configured to assign the threads to the SIMD units for execution based on such differing numbers of ALUs. With this construction, no thread (or a lesser number of threads) will be predicated off.

Some embodiments provide a method for executing multiple threads in parallel. One or more single instruction multiple data (SIMD) units are provided, wherein the SIMD units have differing numbers of arithmetic logic units (ALUs), such that each SIMD unit can execute a different number of threads. The threads are assigned to the SIMD units for execution based upon such differing numbers of ALUs.

Some embodiments provide a non-transitory computer-readable storage medium storing a set of instructions for execution by one or more processors to facilitate manufacture of an integrated circuit to execute multiple threads in parallel. The set of instructions includes a providing code segment and an assigning code segment. The providing code segment provides one or more single instruction multiple data (SIMD) units, wherein the SIMD units have differing numbers of arithmetic logic units (ALUs), such that each SIMD unit can execute a different number of threads. The assigning code segment assigns the threads to the SIMD units for execution based upon such differing numbers of ALUs.

BRIEF DESCRIPTION OF THE DRAWINGS

A more detailed understanding may be had from the following description, given by way of example in conjunction with the accompanying drawings, wherein.

DETAILED DESCRIPTION

A compute unit configured to execute multiple threads in parallel is presented. The compute unit includes one or more single instruction multiple data (SIMD) units and a fetch and decode logic. The SIMD units have differing numbers of arithmetic logic units (ALUs), such that each SIMD unit can execute a different number of threads. The fetch and decode logic is in communication with each of the SIMD units, and is configured to assign the threads to the SIMD units for execution based on such differing numbers of ALUs.

Figure 1:
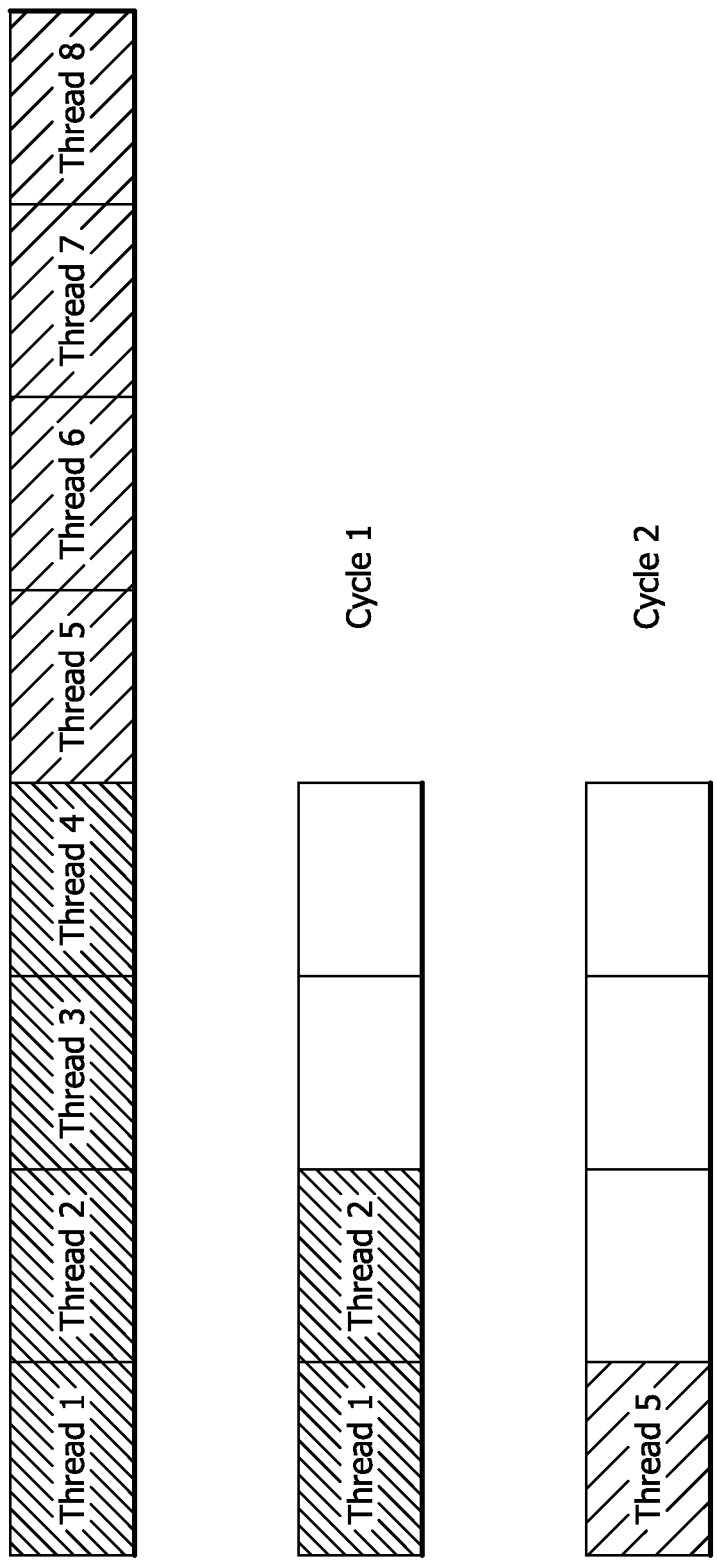
FIG. 1 shows an example of predicated-off threads.
Figure 2:
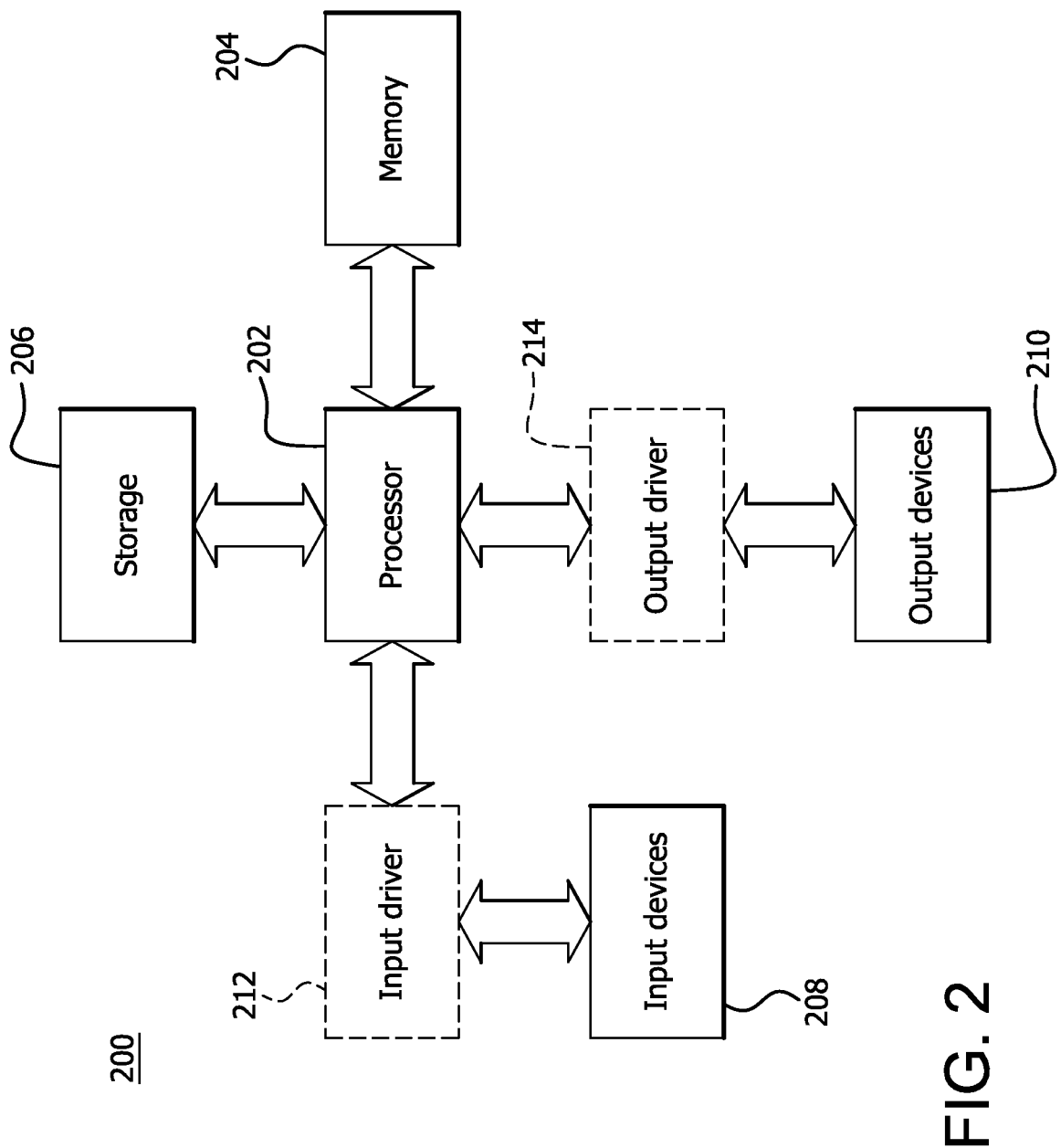
FIG. 2 is a block diagram of an example device in which one or more disclosed embodiments may be implemented.

FIG. 2 is a block diagram of an example device 200 in which one or more disclosed embodiments may be implemented. The device 200 may include, for example, a computer, a gaming device, a handheld device, a set-top box, a television, a mobile phone, or a tablet computer. The device 200 includes a processor 202, a memory 204, a storage 206, one or more input devices 208, and one or more output devices 210. The device 200 may also optionally include an input driver 212 and an output driver 214. It is understood that the device 200 may include additional components not shown in FIG. 2.

The processor 202 may include a central processing unit (CPU), a graphics processing unit (GPU), a CPU and GPU located on the same die, or one or more processor cores, wherein each processor core may be a CPU or a GPU. The memory 204 may be located on the same die as the processor 202, or may be located separately from the processor 202. The memory 204 may include a volatile or non-volatile memory, for example, random access memory (RAM), dynamic RAM, or a cache.

The storage 206 may include a fixed or removable storage, for example, a hard disk drive, a solid state drive, an optical disk, or a flash drive. The input devices 208 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 210 may include a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present.

Figure 3:
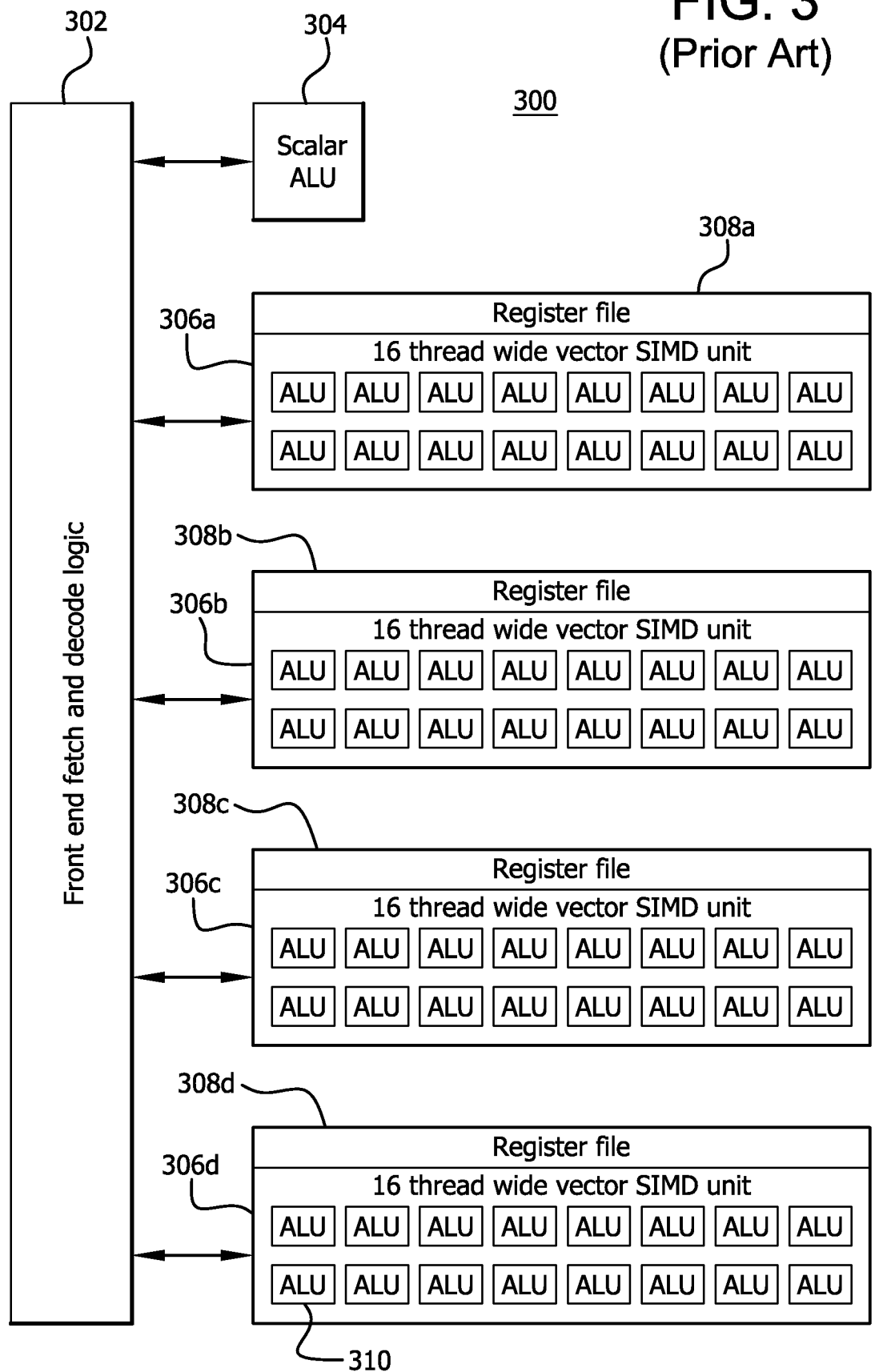
FIG. 3 is a block diagram of a portion of an existing compute unit within a GPU.

FIG. 3 is a block diagram of a portion of an existing compute unit 300 within a GPU. It is noted that the compute unit 300 and the GPU include various additional components not shown in FIG. 3. FIG. 3 only shows the portions of the compute unit 300 relevant to understanding the concepts described herein.

The compute unit 300 includes a front end fetch and decode logic 302, a scalar arithmetic logic unit (ALU) 304, four 16 thread wide vector SIMD units 306a-306d, each with an associated register file 308a-308d. Each of the vector SIMD units 306 includes 16 ALUs 310.

Figure 4:
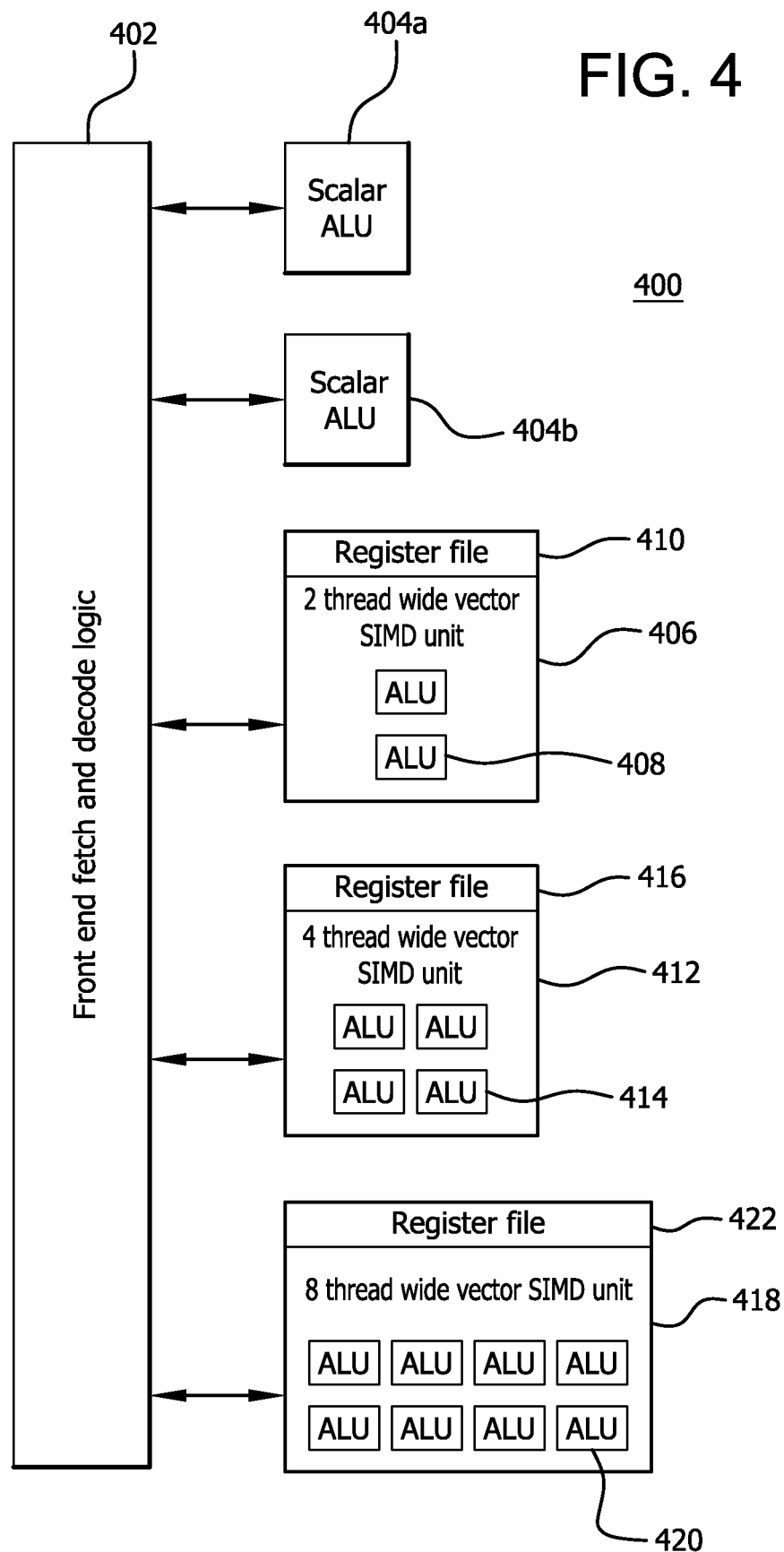
FIG. 4 is a block diagram of a portion of a compute unit with different sizes of SIMD units.

FIG. 4 is a block diagram of a portion of a compute unit 400 with different sizes of SIMD units. It is noted that the compute unit 400 includes various additional components not shown in FIG. 4. FIG. 4 only shows the portions of the compute unit 400 relevant to understanding the concepts described herein.

The compute unit 400 includes a front end fetch and decode logic 402 and one or more scalar arithmetic logic units (ALUs) 404a, 404b. The compute unit 400 also includes a number of different sizes of SIMD units. A two thread wide vector SIMD unit 406 includes two ALUs 408 and has an associated register file 410. A four thread wide vector SIMD unit 412 includes four ALUs 414 and has an associated register file 416. An eight thread wide vector SIMD unit 418 includes eight ALUs 420 and has an associated register file 422.

It is noted that while the compute unit 400 is shown with two scalar ALUs 404, one two thread wide vector SIMD unit 406, one four thread wide vector SIMD unit 412, and one eight thread wide vector SIMD unit 418, the compute unit 400 may be constructed with different numbers of the scalar units and the SIMD units without affecting the overall operation of the compute unit 400. Alternatively, SIMD units 406, 412, and 418 may initially have the same width (e.g., each being an eight thread wide SIMD unit) but may be configured (on a demand basis) to deactivate (e.g., through gating mechanisms, disabling, powering off, etc.) to have different widths (e.g., a two thread wide, a four thread wide, and an eight thread wide SIMD unit, as described above, by deactivating, six, four, and zero, respectively, pipes or ALUs in each unit).

By providing a set of execution resources within each GPU compute unit tailored to a range of execution profiles, the GPU can handle irregular workloads more efficiently. Current GPUs (for example, as shown in FIG. 3) only support a single uniform wavefront size (for example, logically supporting 64 thread wide vectors by piping threads through 16 thread wide vector units over four cycles). Vector units of varying widths (for example, as shown in FIG. 4) may be provided to service smaller wavefronts, such as by providing a four thread wide vector unit piped over four cycles to support a wavefront of 16 element vectors. In addition, a high-performance scalar unit may be used to execute critical threads within kernels faster than possible in existing vector pipelines, by executing the same opcodes as the vector units. Such a high performance scalar unit may, in certain instances, allow for a laggard thread (as described above) to be accelerated. By dynamically issuing wavefronts to the execution unit best suited for their size and performance needs, better performance and/or energy efficiency than existing GPU architectures may be obtained.

If a wavefront has 64 threads (but only 16 active threads), instead of scheduling the wavefront to a 16 thread wide SIMD unit, the wavefront may be scheduled to a four thread wide SIMD unit. Based on demand (a need basis), the scheduler determines whether to schedule the wavefront to all four thread wide SIMD units or just to a subset of the SIMD units. The threads migrating between these functional units can have their context (register values) migrated with the help of software (using "spill" and "fill" instructions) or with dedicated hardware that helps the migration. Alternately, only the data needed for the upcoming instruction or instructions can be forwarded along with the work through a register-functional unit crossbar or other interconnection. This determination provides a finer granularity control over how the threads are executed. By dispatching work to a narrower vector unit compared to the baseline wide vector unit, it is possible to execute only as many threads as will actually produce results, thereby saving power.

Taken to the extreme, when there are a very small number of active threads within a GPU kernel, the GPU's architecture can be more inefficient. Current GPU pipelines are optimized for throughput at the expense of latency. However, if these few active threads (for example, one) are critical to entering the next phase of computation (or they are the last threads that must be completed before a kernel is finished), then the heavily-threaded GPU execution engine adds significant latency and provides no benefit. Being able to dispatch these threads to a higher-performing scalar unit would increase total performance and improve power and energy efficiency.

This approach also works well with branch divergence in a wavefront. Because of branch divergence, some threads follow a control flow path, and other threads will not follow the control flow path, which means that many threads are predicated off. So effectively, there will only be a few subsets of threads running. When it is determined that the active threads can be run in a smaller width SIMD unit, then the threads will be moved to the smaller width SIMD unit, and any unused SIMD units will not be powered up.

Similarly, if control divergence or other issues reduce the number of active threads in a wavefront, the narrower execution resource may be more efficient as well. For example, some divergent wavefronts may have only half of their threads enabled at any one time. In this case, it would be preferable to execute the threads on an eight thread wide vector pipeline over four cycles, rather than executing on a 16 thread wide vector pipeline over four cycles where the last two cycles are only issuing "useless" work that consumes power for no results.

In another example, assume that a wavefront includes 16 threads to be scheduled to a 16 thread wide SIMD unit, and only four of the threads are executing (the remaining 12 threads are not executing). So there are 12 threads doing "useless" work, but they are also filling up pipeline cycles, thereby wasting energy and power. By using smaller (and different) sizes of SIMD units (or vector pipelines), the wavefronts can be dynamically scheduled to the appropriate width SIMD units, and the other SIMD units may be powered off (e.g., power gated off or otherwise deactivated). By doing so, the saved power may be diverted to the active SIMD units to clock them at higher frequencies to boost their performance.

The smaller width SIMD units may be, for example, one, two, four, or eight threads wide. When a larger thread width SIMD unit is needed, any available smaller thread width SIMD units may be combined to achieve the same result. There is no performance penalty if, for example, the wavefront needs a 16 thread wide SIMD unit, but the hardware only includes smaller thread width SIMD units.

In some embodiments, the collection of heterogeneous execution resources is shared among multiple dispatch engines within a compute unit. For instance, rather than having four 16 thread wide vector units, four dispatchers could feed three 16 thread wide vector units, four four thread wide vector units, and four high-performance scalar units. The dispatchers could arbitrate for these units based on their required issue demands.

The issue logic (the front-end of the hardware pipeline) needs to know the number and thread width of the available SIMD units every cycle. The issue logic also needs to know which threads are enabled or disabled every cycle. This information is reported back to the issue logic every cycle, and once the issue logic determines what is needed in terms of overall thread width for execution, it dispatches the instructions for execution to the appropriate unit(s).

The issue logic dynamically determines which execution unit to target for a given collection of threads (a wavefront) based on a variety of factors. For instance, if the number of active threads in a wavefront is very small (for example, one or two), the threads may be dispatched to the high-performance scalar unit, where the instruction will complete in only a couple of cycles. This enables threads that are potentially the bottleneck of computation to be executed more quickly and efficiently than would occur on a heavily underutilized 64 element wide vector pipeline.

In another example, if performance counters or backpressure signals from the memory system indicate that memory bandwidth is a bottleneck, issuing instructions to a narrower execution engine (e.g., a four thread wide engine over 16 clock cycles rather than a 16 thread wide engine over four clock cycles) may prove more power efficient at no discernible performance cost.

Different factors may be used to determine how to group the threads together into a wavefront. This grouping may be performed via a heuristic (for example, multiple if-then evaluations). There is a trade-off between the complexity of this analysis and wanting to group the threads as quickly as possible, meaning that the best algorithm might take too long to provide the best results.

Current GPUs (for example, as shown in FIG. 3) are designed with a 16 thread wide SIMD unit, and there may be multiple front-ends (multiple issue units) sharing multiple back-end units. The design may be modified to include N issue units that share M SIMD units, and those SIMD units may be of different thread widths.

The N issue units may be built as a distributed system, where the issue units all pull from the same pool of available threads. For instance, if the system includes one thread pool and N issue units, the N issue units would agree on which issue unit will issue thread X in the current cycle and which issue unit will issue thread Y in the current cycle. This may be achieved by having all N issue units connected through a crossbar or other on-chip network to a shared thread pool. Alternately, each issue unit may be associated with a private thread pool and could "push" control of a thread to other issue units or "pull" threads from another issue unit.

The N issue units may share all M execution units, and would decide how to schedule the threads based on a consensus algorithm. For example, each issue unit has an execution unit (or set of execution units) which it prioritizes, and that issue unit can only issue threads to other execution units if all other issue units agree to allow it. A different consensus algorithm would be to allow issue units to send threads to an execution unit on a first-come, first-serve basis. But this does not mean that all issue units in the GPU must be able to communicate with all execution units in the GPU; the N issue units and M execution units may be grouped into "compute units" that only make up part of the total resources on a GPU.

Figure 5A:
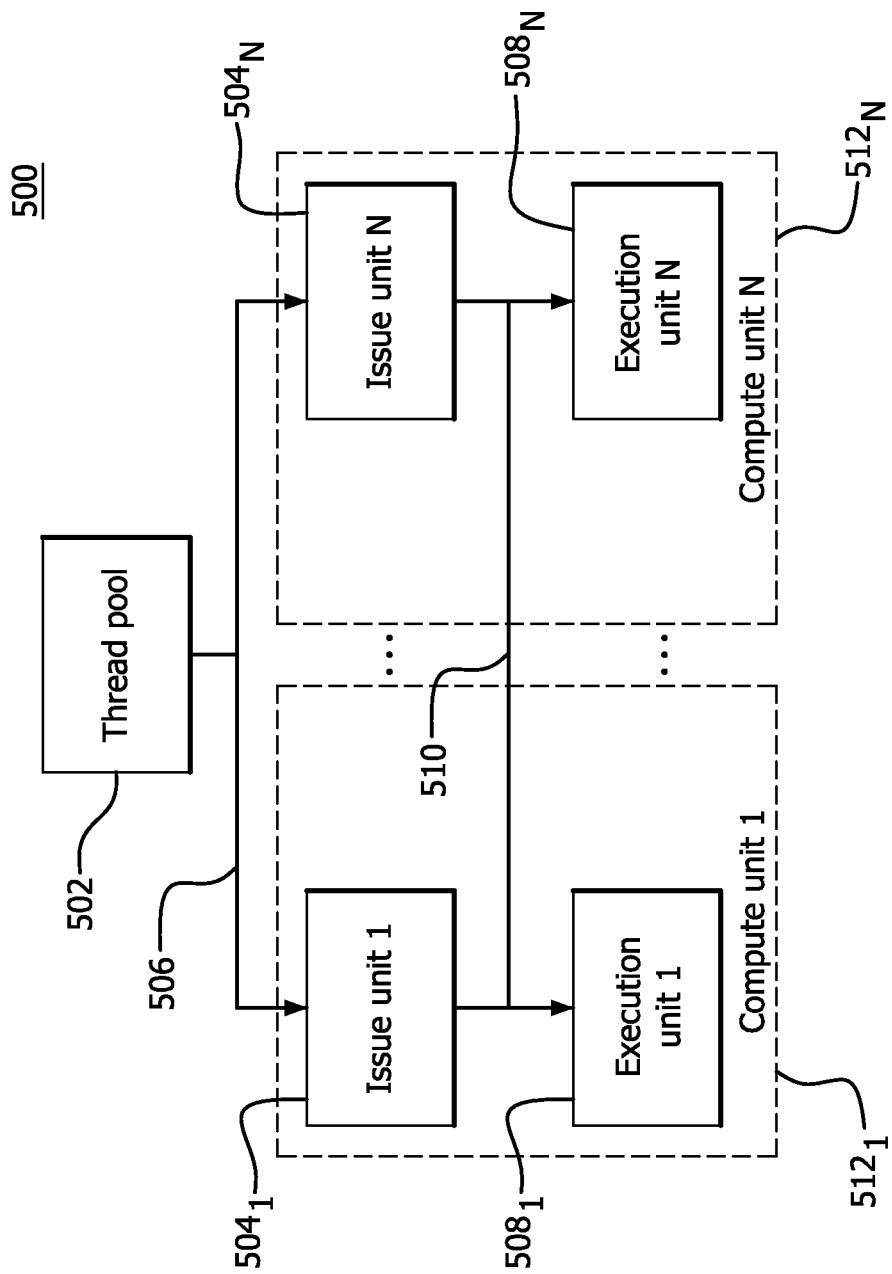
FIG. 5A is a diagram of a portion of a GPU with multiple issue units and a single thread pool.

FIG. 5A is a diagram of a portion of a GPU 500 with a single thread pool 502 and multiple issue units 504$_1$-504$_N$. The issue units 504$_1$-504$_N$ may be connected to each other and to the thread pool 502 by a crossbar 506 or other type of interconnection. Each issue unit 504 has one or more associated execution units 508$_1$-508$_N$. The execution units 508$_1$-508$_N$ are connected to the issue units 504$_1$-504$_N$ by a crossbar 510 or other type of interconnection. Each issue unit 504 and its associated execution unit(s) 508 may be grouped together as a compute unit 512. As noted above, the execution units 508 may be associated with a single issue unit 504 or may be shared among all of the issue units.

Figure 5B:
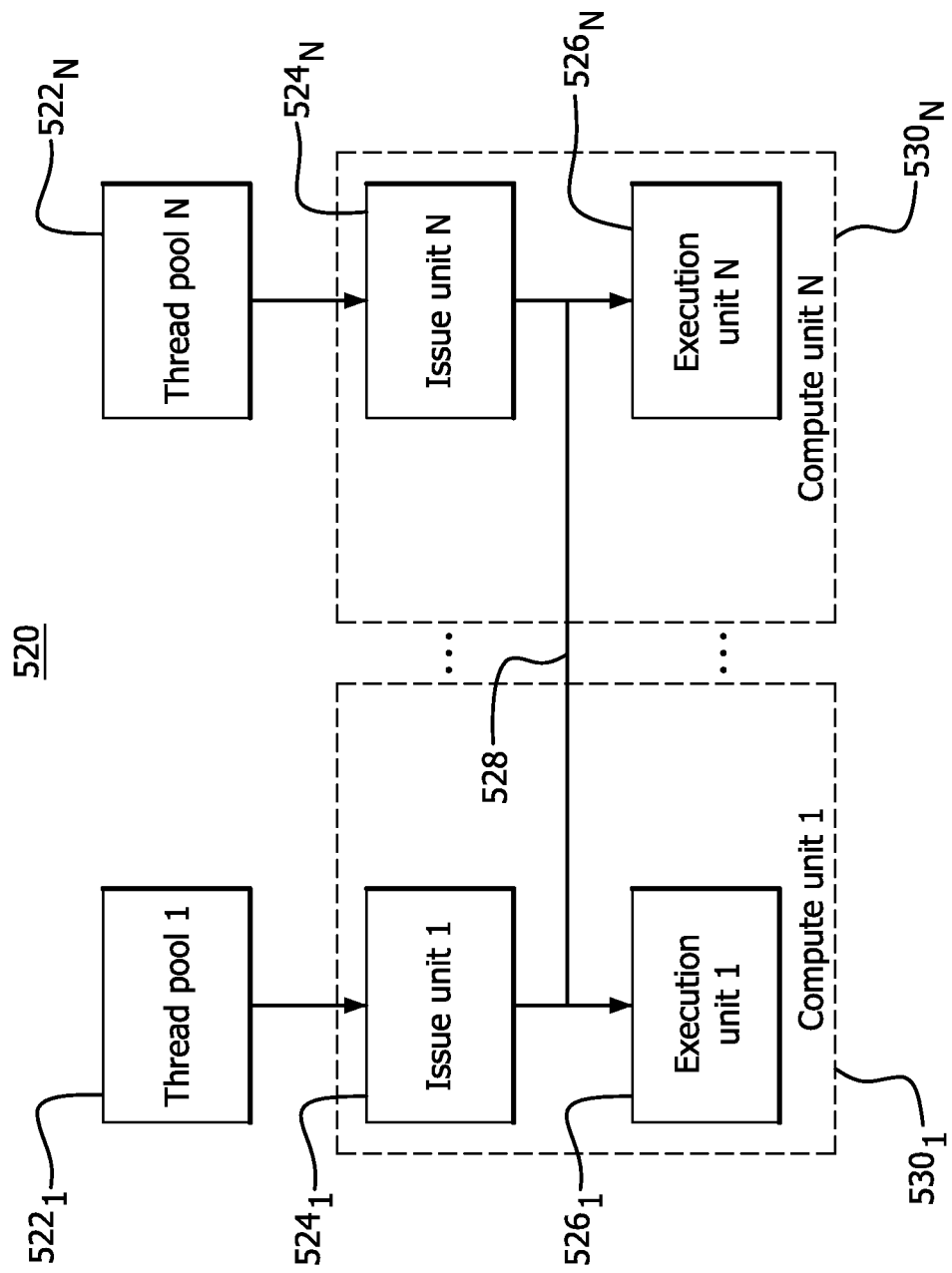
FIG. 5B is a diagram of a portion of a GPU with multiple issue units and multiple thread pools.

FIG. 5B is a diagram of a portion of a GPU 520 with multiple thread pools $522_1$-$522_N$ and multiple issue units $524_1$-$524_N$. Each thread pool $522_1$1-$522_N$ is associated with a single issue unit $524_1$-$524_N$. Each issue unit 524 has one or more associated execution units $526_1$-$526_N$. The execution units $526_1$-$526_N$ are connected to the issue units $524_1$-$524_N$ by a crossbar 528 or other type of interconnection. Each issue unit 524 and its associated execution unit(s) 526 may be grouped together as a compute unit 530. As noted above, the execution units 526 may be associated with a single issue unit 524 or may be shared among all of the issue units.

Heterogeneous vector pipeline resources can be defined as an array R[t][i], where t is a resource type and i is a resource identifier. A resource type in this case may be vector instructions or integer instructions, for example. Similarly, heterogeneous decode and issue resources can be defined as an array D[t][j], where t is the decode type and j is a resource identifier. The mapping D→T can be a "few-to-many" operation. The scheduler dynamically maps D[t][j]→R[t][i] in such a way that instructions can be decoded and issued from a small (perhaps centralized) set of resources for this wavefront to any available vector stages for that type of instruction. In some cases, it may be preferable to use both the regular vector pipelines and the smaller pipelines to maximize total throughput of the system.

As an example, two sets of threads, each trying to perform different operations, can be waiting to be scheduled within a GPU. The first set, threads 0-12 (13 threads), are to perform a floating point multiplication. The second group, threads 2013-2017 (five threads), are to perform an integer addition. However, only two floating point units (FPUs) and two integer units (IUs) are available.

In this example, therefore, the constant wavefront of a classical GPU architecture would be two threads. The classical GPU architecture would schedule the floating point multiplications over seven cycles across the two FPUs and would schedule the integer instructions over three cycles across the two IUs. So, the classical GPU architecture performs 14 threads of floating point work and six threads of integer work—wasted work for 13 and five threads worth of work, respectively.

Instead, for the floating point multiplication, six cycles× two FPUs and one cycle×one FPU may be scheduled, doing exactly 13 threads of work (the remaining FPU may be powered off, for instance). Similarly, for the integer addition, two cycles×two IUs and one cycle×one IU may be scheduled.

If execution resources R[t] of different types can cover certain computations, then the scheduler can schedule that computation over different heterogeneous resources. In the example above, if the FPUs were also able to execute integer operations (perhaps the IUs cannot execute floating point operations, however), then the extra integer operations available during the trailing cycle of the floating point operation could be used by the integer instructions, further increasing pipeline efficiency.

Finally, if these different types of units ran at different frequencies (or if they were on different voltage islands, allowing them to change voltage and frequency on demand), then it may be possible to schedule some threads on execution units running at different frequencies and with different thread widths, again potentially improving power efficiency. By utilizing the power saved by executing on lower-powered vector units, other vector units (perhaps those running more performance-critical threads) could be overclocked to yield higher overall program performance.

Figure 6:
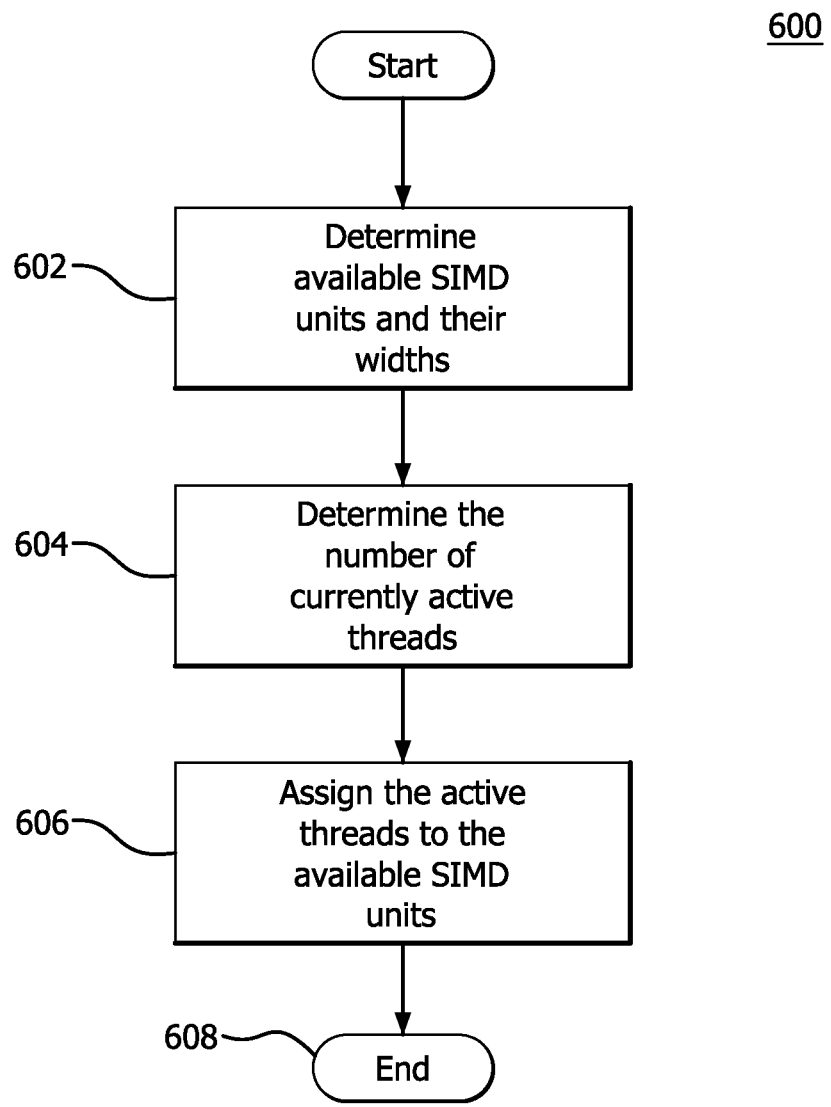
FIG. 6 is a flowchart of a method for assigning threads to a compute unit with different sizes of SIMD units.

FIG. 6 is a flowchart of a method 600 for assigning threads to a compute unit with different sizes of SIMD units. The number of available SIMD units and the width of each SIMD unit are determined (step 602). The number of currently active threads is determined (step 604). The active threads are assigned to the SIMD units, in a combination such that work is not wasted (step 606), and the method then terminates (step 608).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising a plurality of compute units configured to execute a plurality of threads, at least one compute unit comprising:
  a plurality of single instruction multiple data (SIMD) units, each of the plurality of SIMD units comprising (i) a different fixed number of arithmetic logic units (ALUs) to execute a different fixed number of threads and (ii) an associated register file separate from associated register files of other SIMD units;
  one or more scalar ALUs each configured to execute a thread of the plurality of threads faster than each of the plurality of SIMD units;
  a fetch and decode logic in communication with each of the plurality of SIMD execution units and each of the one or more scalar ALUs, the fetch and decode logic configured to:
    determine a number of active threads of a group of the plurality of threads to be executed;
    determine a width for the group of threads based on a branch divergence of the group of threads;

determine, for each SIMD unit, a number of activated ALUs currently available to execute the group of threads, wherein at least one SIMD unit has a different number of currently available activated ALUs than another SIMD unit;

select one or more SIMD units to execute the group of threads based on the width and the number of activated ALUs currently available; and assign, for execution, the number of active threads to the selected one or more SIMD units.

2. The processing apparatus according to claim 1, wherein the one or more processors is configured to assign the group of threads to the SIMD units for execution such that a result of the execution of each of the group of threads is not discarded.

3. The processing apparatus according to claim 1, wherein the one or more processors is further configured to dynamically change the number of activated ALUs of each SIMD unit to one, two, four, eight, or sixteen ALUs.

4. The processing apparatus according to claim 1, wherein the group of threads to be executed is a wavefront.

5. The processing apparatus according to claim 1, wherein the fetch and decode logic is further configured to dynamically change the number of activated ALUs, of one or more of the plurality of SIMD units, currently available to execute the group of threads based on the number of active threads by deactivating one or more of the number of activated ALUs of the one or more SIMD units.

6. A processing apparatus comprising a plurality of compute units configured to execute a plurality of threads, at least one compute unit comprising:

a plurality of single instruction multiple data (SIMD) units, each of the plurality of SIMD units comprising (i) a different fixed number of arithmetic logic units (ALUs) to execute a different fixed number of threads and (ii) an associated register file separate from associated register files of other SIMD units;

one or more scalar ALUs each configured to execute a thread of the plurality of threads faster than each of the plurality of SIMD units;

a plurality of issue units in communication with the plurality of SIMD units, the plurality of issue units configured to:

determine a number of active threads of a group of the plurality of threads to be executed;

determine a width for the group of threads based on a branch divergence of the group of threads;

determine, for each SIMD unit, a number of activated ALUs currently available to execute the group of threads, wherein at least one SIMD unit has a different number of currently available activated ALUs than another SIMD unit;

select one or more SIMD units to execute the group of threads based on the width and the number of activated ALUs currently available; and assign, for execution, the number of active threads to the selected one or more SIMD units.

7. The processing apparatus according to claim 6, wherein the one or more processors is configured to assign the group of threads to the SIMD units for execution such that a result of the execution of each of the group of threads is not discarded.

8. The processing apparatus according to claim 6, wherein the one or more processors are further configured to dynamically change the number of activated ALUs of each SIMD unit to one, two, four, eight, or sixteen ALUs.

9. The processing apparatus according to claim 6, wherein the group of threads to be executed is a wavefront.

10. The processing apparatus according to claim 6, further comprising:

one thread pool, shared by each of the plurality of issue units.

11. The computing system according to claim 6, further comprising:

a plurality of thread pools, wherein one of the plurality of thread pools is associated with one of the plurality of issue units.

12. The processing apparatus according to claim 6, wherein any one of the plurality of issue units is configured to assign a thread to any one of the plurality of SIMD units.

13. The processing apparatus according to claim 6, wherein each of the plurality of issue units has an associated SIMD unit and is configured to assign a thread to any one of the plurality of SIMD units.

14. A method for executing a plurality of threads, comprising:

executing a group of threads of the plurality of threads via a plurality of single instruction multiple data (SIMD) units each comprising (i) a different fixed number of arithmetic logic units (ALUs) to execute a different fixed number of threads and (ii) an associated register file separate from associated register files of other SIMD units;

determining a number of active threads of the group of threads;

determining a width for the group of threads based on a branch divergence of the group of threads;

determining, for each SIMD unit, a number of activated ALUs currently available to execute the group of threads, wherein at least one SIMD unit has a different number of currently available activated ALUs than another SIMD unit;

selecting one or more SIMD units to execute the group of threads based on the width and the number of activated ALUs currently available;

assigning, for execution, the number of active threads to the selected one or more SIMD units; and executing, via the plurality of SIMD units, the number of active threads.

15. The method according to claim 14, wherein the group of threads to be executed is a wavefront.

* * * * *